United States Patent
Agrawal et al.

(10) Patent No.: US 9,830,184 B2
(45) Date of Patent: *Nov. 28, 2017

(54) SYSTEMS AND METHODS FOR DETERMINING DESKTOP READINESS USING INTERACTIVE MEASURES

(71) Applicant: VMware, Inc., Palo Alto, CA (US)

(72) Inventors: Banit Agrawal, Sunnyvale, CA (US); Lawrence Andrew Spracklen, Boulder Creek, CA (US); Rishi Bidarkar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,453

(22) Filed: Mar. 8, 2016

(65) Prior Publication Data

US 2016/0188361 A1    Jun. 30, 2016

Related U.S. Application Data

(63) Continuation of application No. 13/665,251, filed on Oct. 31, 2012, now Pat. No. 9,292,401.

(51) Int. Cl.
| | |
|---|---|
| *G06F 15/173* | (2006.01) |
| *G06F 9/455* | (2006.01) |
| *H04L 12/26* | (2006.01) |
| *G06F 11/30* | (2006.01) |
| *H04L 12/24* | (2006.01) |
| *G06F 3/0482* | (2013.01) |

(Continued)

(52) U.S. Cl.
CPC ........ *G06F 9/45558* (2013.01); *G06F 3/0482* (2013.01); *G06F 3/04842* (2013.01); *G06F 11/30* (2013.01); *G06F 11/3409* (2013.01); *G06F 11/3423* (2013.01); *H04L 41/22* (2013.01); *H04L 43/0805* (2013.01); *G06F 2009/45591* (2013.01); *G06F 2201/81* (2013.01); *G06F 2201/815* (2013.01); *G06F 2201/86* (2013.01); *G06F 2201/875* (2013.01)

(58) Field of Classification Search
None
See application file for complete search history.

(56) References Cited

U.S. PATENT DOCUMENTS

| | | | |
|---|---|---|---|
| 7,831,661 B2 | 11/2010 | Makhija et al. | |
| 2008/0235581 A1* | 9/2008 | Caporale ................. | A63F 13/12 715/706 |

(Continued)

*Primary Examiner* — Younes Naji

(57) ABSTRACT

Systems and methods described herein facilitate determining desktop readiness using interactive measures. A host is in communication with a server and the host includes a virtual desktop and a virtual desktop agent. The virtual desktop agent is configured to perform one or more injecting events via one or more monitoring agents, wherein each of the injecting events is a simulated input device event. The desktop agent is further configured to receive, via a display module, a response to the injecting event(s), wherein the response is a display update causing pixel color values for the display module to alter. The desktop agent is also configured to identify, via the monitoring agent(s), whether the response to the injecting event(s) is an expected response. The desktop agent is also configured to determine, via the monitoring agent(s), a readiness of the virtual desktop based on the expected response.

17 Claims, 2 Drawing Sheets

(51) Int. Cl.
G06F 3/0484 (2013.01)
G06F 11/34 (2006.01)

(56) References Cited

U.S. PATENT DOCUMENTS

| | | | |
|---|---|---|---|
| 2010/0306163 A1* | 12/2010 | Beaty | G06F 9/5077 706/52 |
| 2012/0144246 A1* | 6/2012 | Dreyfoos | G06F 11/302 714/47.1 |
| 2012/0266078 A1 | 10/2012 | Kulkarni | |
| 2013/0339949 A1 | 12/2013 | Spiers | |

* cited by examiner

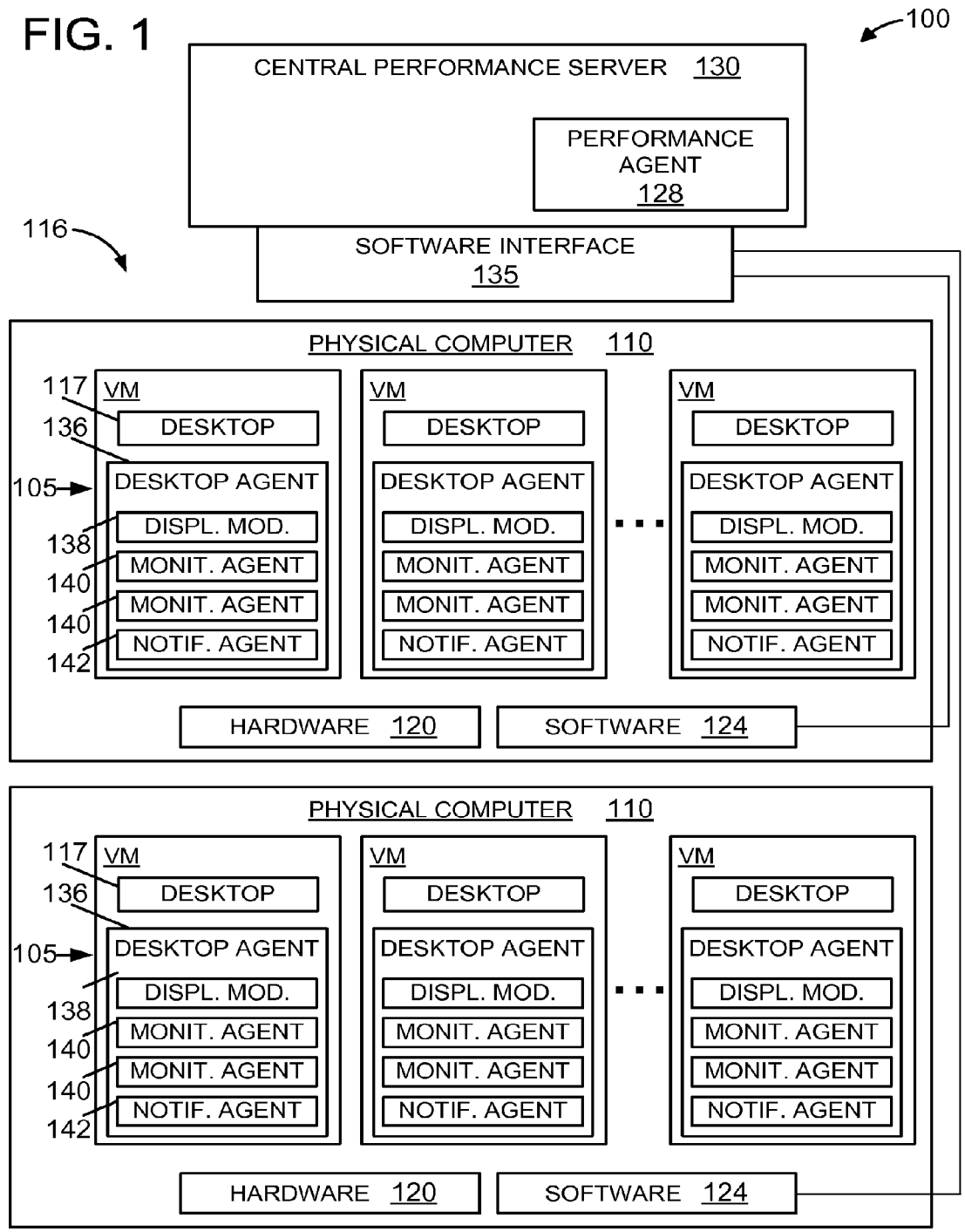

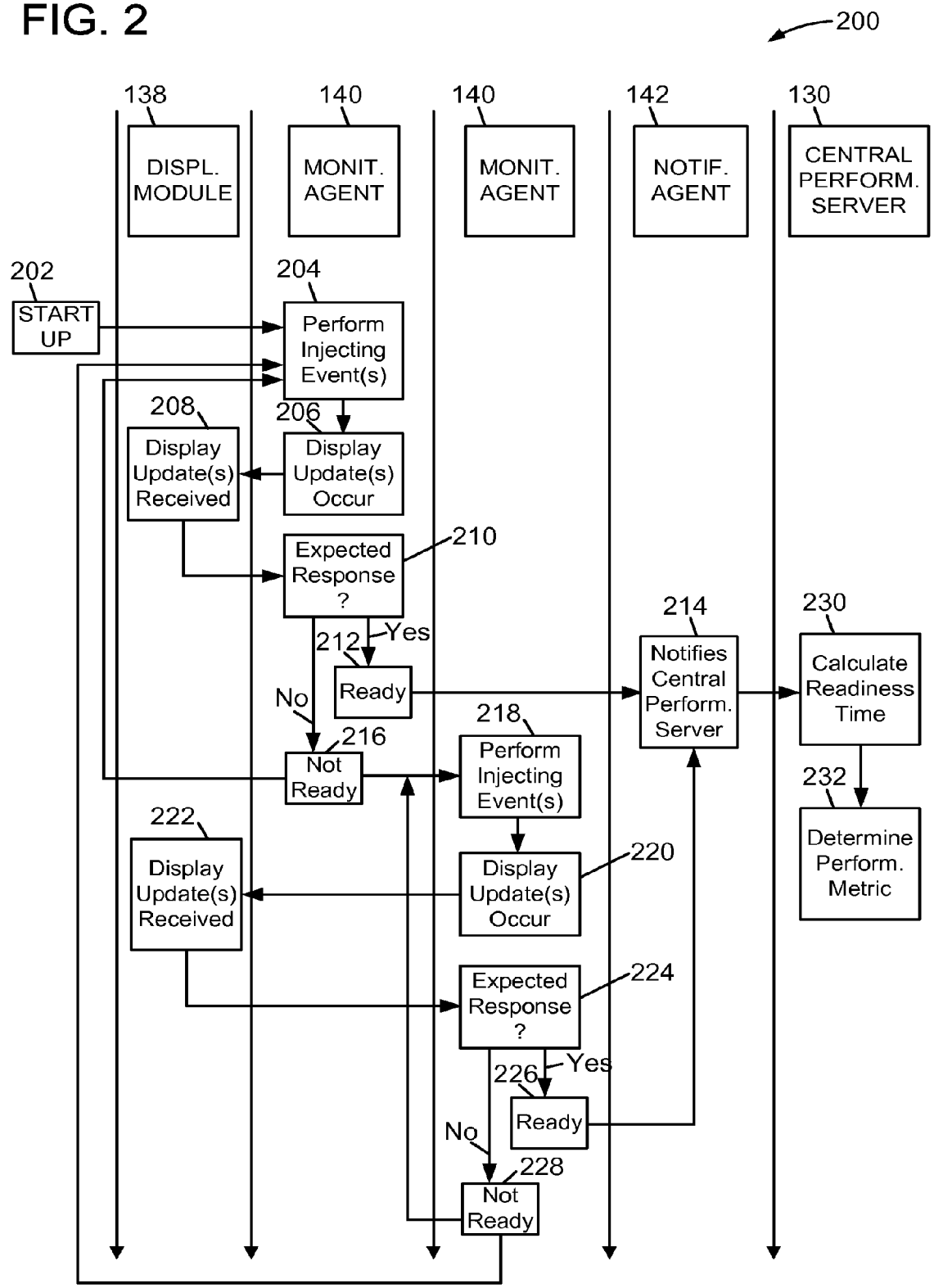

SYSTEMS AND METHODS FOR DETERMINING DESKTOP READINESS USING INTERACTIVE MEASURES

CLAIM OF PRIORITY

This application claims priority to and is a continuation of U.S. patent application Ser. No. 13/665,251, filed on Oct. 31, 2012, entitled "Systems and Methods for Determining Desktop Readiness Using Interactive Measures", which is incorporated herein by reference in its entirety.

BACKGROUND

Virtual Desktop Infrastructure (VDI) refers to a system of providing complete centrally-managed desktops to users using computer virtualization technology. VDI is used to create a large number of independent computing environments for a large number of users. In a typical VDI architecture, user displays and input devices are local, but applications execute remotely in a server. Understanding and accurately quantifying the time it takes for the desktop to be available after a power-on, reboot, or login of the desktop (i.e., the desktop readiness) is important in many VDI management operations, such as boot-storm and login-storm operations for desktops. In such operations, the desktops cause a relatively heavy load on the underlying infrastructure platform. The performance of the desktops can also vary depending on how the platform is responding to the demands of the VDI management operations. As such, a determination of how the desktops are responding quantitatively and a determination of the distribution of the ready time for the desktops can help characterize and tune the hardware platform.

Several approaches may be used to measure or identify when a desktop is active or ready for use. In one approach, a Microsoft Windows® service may start running when a desktop is powered-on (Windows is a registered trademark of Microsoft Corporation of Redmond, Wash.). The service is then externally monitored to determine whether the desktop is active. However, this approach may not provide an accurate readiness time for the desktop. For example, even though the particular service may have started, the desktop may still not be usable for the end-user because a user profile, other settings, and/or applications are loading. In other approaches, event-based notification programs are used to provide a signal when the desktop is active or ready for use. However, because such programs are configured to execute immediately upon the desktop being powered-on, the responsive time of the desktop may not be accurately captured. Since the determined readiness time may be inaccurate, a performance feedback loop that is based on the readiness time may be incorrect as well. As a result, the desktop performance may not be optimal. Accordingly, there is a need for an automated system and method for accurately determining desktop readiness using interactive measures.

SUMMARY

Systems and methods described herein facilitate determining desktop readiness using interactive measures. A host is in communication with a server and the host includes a virtual desktop and a virtual desktop agent. The virtual desktop agent is configured to perform one or more injecting events via one or more monitoring agents, wherein each of the injecting events is a simulated input device event. The desktop agent is further configured to receive, via a display module, a response to the injecting event(s), wherein the response is a display update causing pixel color values for the display module to alter. The desktop agent is also configured to identify, via the monitoring agent(s), whether the response to the injecting event(s) is an expected response. The desktop agent is also configured to determine, via the monitoring agent(s), a readiness of the virtual desktop based on the expected response.

BRIEF DESCRIPTION OF THE DRAWINGS

FIG. 1 is a block diagram of an exemplary virtual desktop infrastructure (VDI) having one or more virtual desktops.

FIG. 2 is a swimlane diagram of an exemplary method for determining a readiness of one of the virtual desktops shown in FIG. 1.

DETAILED DESCRIPTION

FIG. 1 is an exemplary virtual desktop infrastructure (VDI) 100 having a plurality of virtual machines (VMs) 105 on physical computer systems, or hosts, 110 and 112, collectively known as a cluster 116. Each physical computer 110 and 112 includes hardware 120, a virtualization software, or manager, 124 running on the hardware 120, and one or more VMs 105 executing on the hardware 120 by way of the virtualization software 124. The virtualization software 124 is therefore logically interposed between, and interfaces with, the hardware 120 and the VMs 105. The virtualization software 124 may be implemented directly in the hardware, e.g., as a system-on-a-chip, firmware, FPGA, etc. The hardware 120 includes at least one processor (not shown), wherein each processor is an execution unit, or "core," on a microprocessor chip. The hardware 120 also includes system memory (not shown), which is general volatile random access memory (RAM), a network interface port (NIC), and other devices.

The virtualization software 124 is sometimes referred to as a hypervisor, and includes software components for managing hardware resources and software components for virtualizing or emulating physical devices to provide virtual devices, such as virtual disks, virtual processors, virtual network interfaces, etc., for each VM 105. Each VM 105 is an abstraction of a physical computer system and may include an operating system (OS) such as Microsoft Windows® and applications, which are referred to as the "guest OS" and "guest applications," respectively, wherein the term "guest" indicates it is a software entity that resides within the VM.

A Central Performance Server (CPS) 130 provides a software interface 135 that, among other things, allows other programs to monitor and/or control the performance of the VMs 105 running on physical computers 110 and 112 that are managed by the CPS 130. In the exemplary embodiment, the CPS 130 includes a performance agent 128 that is software configured to determine a performance metric of each host 110 and 112. The CPS 130 may provide other varying VM performance management and manipulations that are not specifically described herein.

Each VM 105 provides a virtual desktop 117 to a user of the VMs 105. The desktop 117 is an interactive user environment provided by the guest OS and applications running within the VM, and generally includes a graphical display, but may include other outputs, such as audio, indicator lamps, tactile feedback, etc. The desktop 117 also accepts input from the user in the form of device inputs, such as keyboard and mouse inputs. The desktop 117 may also accept simulated inputs, such as simulated keyboard and mouse inputs. In addition to user input/output, the desktop 117 may send and receive device data, such as input/output for a FLASH memory device local to the remote user, or to a local printer.

Each VM 105 also includes a virtual desktop agent 136 wherein each desktop agent 136 is software that is automatically executed by the guest OS when the desktop 117 is started, rebooted, or logged into by an end user. Each desktop agent 136 is configured to use and monitor injecting events, such as simulated keyboard events and/or simulated mouse click events, to determine a readiness of the corresponding virtual desktop 117. More specifically, in the exemplary embodiment, each desktop agent 136 includes a display module 138, one or more monitoring agents 140 (only two being shown within each desktop agent 136 in FIG. 1), and a notifying agent 142. The display module 138 may be implemented as a mirror display driver or any driver, module, plug-in or other mechanism for receiving and processing a framebuffer or framebuffer updates.

In the exemplary embodiment, the monitoring agents 140 are configured to perform injecting events that are simulations of any non-destructive user input, such as, but not limited to, a tap event, a zoom function, a keyboard input, or a mouse click. For example, in the exemplary embodiment, injecting events may be a simulated input device event, wherein the simulated input device includes user input devices, such as the mouse or the keyboard, and/or may also include USB attachment, loading a CD-ROM, etc. In one embodiment, the injection event may include a simulated left mouse click of an OS menu button (not shown), such as a start menu button (not shown). The injecting events may also include a simulated right mouse click on an empty background (not shown) of the virtual desktop 117, and/or a click on an icon on the virtual desktop 117, among other interactive operations. Each monitoring agent 140, in the exemplary embodiment, corresponds to a different type of injecting event. For example, one monitoring agent 140 may correspond to the left click of the OS menu button and another monitoring agent 140 may correspond to the right click on the empty background. In some embodiments, monitoring agents 140 are configured to monitor more than one injecting event.

The display module 138 is configured to receive a response that corresponds to each of the injecting events. The response to each of the injecting events may include at least one display update of the virtual desktop 117, wherein the display update includes a change in pixel values of the virtual desktop 117. For example, the response may be a display update causing pixel color values for the display module 138 to alter. In one embodiment, a display update, such as a rectangular box, that is aligned with a location of the OS menu button may occur in response to the left click. A response to the right click on the empty background may include a display update, such as a rectangular box, that is aligned with a location of the right click. Each monitoring agent 140 is configured to identify whether the response to the corresponding injecting event is an expected response. For example, the monitoring agent 140 that corresponds with the left click may also be configured to identify whether the display update associated with the left click occurs within a predefined threshold time. Similarly, the monitoring agent 140 that corresponds with the right click may be configured to identify whether the display update associated with the right click occurs within a predefined threshold time.

Each monitoring agent 140 is also configured to determine a readiness of the virtual desktop 117, such as when the desktop 117 is active or ready to be used, based on the expected response. For example, if the monitoring agent 140 identifies that the display update occurs within the predefined threshold time, then the virtual desktop 117 is deemed ready by the monitoring agent 140. Alternatively, if the monitoring agent 140 identifies that the display update did not occur within the predefined threshold time, then the virtual desktop 117 is not deemed ready. The notifying agent 142 is configured to notify the CPS 130 when the readiness of the virtual desktop 117 is determined by the monitoring agent 140.

In some implementations, the monitoring agent 140 may execute from a remote client (not shown) that is connected to the virtual desktop 117 such that the injecting events are performed remotely by the client. The remote client may be connected to the virtual desktop 117 using a remote display protocol that enables the monitoring agent 140 on the remote client to perform injecting events, receive display updates, and determine the readiness of the virtual desktop 117. The remote client may display a message and/or hide the desktop 117 until the virtual desktop 117 is ready.

During operation, at least one of the virtual desktops 117 of hosts 110 and/or 112 may be started, rebooted, or logged into, at which time the desktop agent 136 is automatically executed by the guest OS. One or monitoring agents 140 each perform at least one injecting event. For example, in the exemplary embodiment, one monitoring agent 140 may start off with a simulated left mouse click on an OS menu button of the desktop 117, such as the start menu button. In response to the left click, a display update of the virtual desktop 117 occurs. For example, a rectangular box appears at the location of the start menu in response to the left click. The response to the left click is received by the display module 138.

The monitoring agent 140 identifies whether the response is an expected response. More specifically, the monitoring agent 140 identifies whether the rectangular box appears at the location of the start menu within a predefined threshold time. If the monitoring agent 140 identifies that the rectangular box appeared at the location of the start menu within the predefined threshold time, the desktop 117 is determined to be active or ready for use by the monitoring agent 140. When the desktop 117 is deemed ready for use by the monitoring agent 140, the notifying agent 142 notifies the CPS 130 of the desktop readiness.

Alternatively, if the monitoring agent 140 identifies that the rectangular box did not appear at the location of the start menu or did not appear at the location within the predefined threshold time, the desktop 117 is deemed not ready for use by the monitoring agent 140. For example, if a user profile, other settings, and/or applications are loading, then the rectangular box may not respond to the left click. If the desktop 117 is deemed not ready, the monitoring agent 140 may continue to left click on the OS menu button. However, repeated left clicking events while the desktop 117 is not ready may make it difficult to accurately identify corresponding responses. For example, the monitoring agent 140 may perform a first left click and, due to no response, the monitoring agent 140 may perform a second left click. Since the desktop 117 may not be ready, two delayed responses may occur. It may be difficult to accurately identify which of the two responses correspond with the first or second left click event. As such, when the monitoring agent 140 performs the repeated left mouse clicks on the OS menu button, the left mouse clicks are performed at various time intervals.

For example, the monitoring agent 140 may perform a first left click and then wait some time, such as a few seconds, to perform a second left click.

The desktop agent 136 may perform a variety of different injecting events and monitor each injecting event using one or more monitoring agents 140. For example, in the exemplary embodiment, the desktop agent 136 may use the other monitoring agent 140 to perform a simulated right mouse click on an empty background of the desktop 117. In response to the right click, a rectangular box appears at the location of the right click on the empty background. The response to the right click is received by the display module 138. The monitoring agent 140 that corresponds to the right click identifies whether the response is an expected response. More specifically, the monitoring agent 140 identifies whether the rectangular box appears at the location of the right click on the desktop within a predefined threshold time. If the monitoring agent 140 identifies that the rectangular box appeared at the location of the right click within the predefined threshold time, the monitoring agent 140 determines that the desktop 117 is ready for use.

If the monitoring agent 140 identifies that the rectangular box did not appear at the location of the right click within the predefined threshold time, the desktop is deemed not active or not ready for use. If the desktop 117 is deemed not ready for use, the monitoring agent 140 may perform a simulated right mouse click on the same location on the empty background of the desktop 117. However, as described above, repeated clicking events, while the desktop 117 is not ready, may make it difficult to accurately identify corresponding responses to each of the right clicks. As such, when the monitoring agent 140 performs repeated right clicks, each of the right clicks may be performed at different locations, such that a response for each right click can be identified. Alternatively, the monitoring agent 140 may perform the right clicks at the same location at different time intervals such that there is a time lapse between each click or the desktop agent 136 may switch to a different injecting event with a different monitoring agent 140.

The readiness determinations can be verified by the desktop agent 136. When the monitoring agent 140 identifies that a display update to an injecting event occurred within a predefined threshold, the monitoring agent 140 can perform subsequent injecting events to identify whether each response to the injecting events occur within the predefined threshold. For example, when the monitoring agent 140 performs repeated right clicks on different locations on the empty background of the desktop 117, the monitoring agent 140 will identify whether each response corresponding to each right click occurs within the predefined threshold. When all the responses have been identified as occurring within the predefined threshold, then the monitoring agent 140 will determine that the desktop 117 is active or ready for use. The notifying agent 142 will then notify the CPS 130 of the desktop readiness. In some embodiments, readiness is not determined until two or more different injecting events produce expected responses.

When the desktop 117 is deemed ready and the CPS 130 is notified of the desktop readiness, the CPS 130 can use information regarding the desktop readiness to determine a performance metric for the hosts 110 and/or 112. More specifically, in the exemplary embodiment, the CPS 130 calculates a readiness time for the desktop 117 by comparing the time for when the virtual desktop 117 was deemed ready for use with the start time, the re-boot time, or the login time of the virtual desktop 117. The performance agent 128 uses the readiness time to determine a performance metric of the hosts 110 and/or 112. The performance agent 128 may use the readiness time to tune and/or adjust the resources such that the end user can receive an optimal performance when connecting to their desktop 117. For example, the number of VMs 105 may be reduced by the CPS 130 and/or the CPS 130 may add a delay such that a fewer number of VMs 105 are booting simultaneously. The CPS 130 may also receive readiness notifications from multiple desktops 117 within each host 110 and/or 112. The CPS 130 would then calculate a readiness time for each desktop 117. As such, the performance agent 128 can use the calculated readiness times for the desktops 117 to determine a performance metric of each respective host 110 or 112.

FIG. 2 is a swimlane diagram of an exemplary method 200 for determining a readiness of a virtual desktop, such as one of the virtual desktops 117 (shown in FIG. 1) using a virtual desktop agent, such as the virtual desktop agent 136 (shown in FIG. 1). In operation 202, the virtual desktop 117 is started and the desktop agent 136 is automatically executed by the guest OS. One monitoring agent 140 performs at least one injecting event in operation 204. In some implementations, the monitoring agent 140 is on the hosts 110 and/or 112, and in some implementations, the monitoring agent 140 is on a remote client (not shown). More specifically, in the exemplary embodiment, the monitoring agent 140 performs a simulated left mouse click on an OS menu button of the desktop 117, such as the start menu button. In response to the left click, a display update of the virtual desktop 117 occurs in operation 206. For example, a rectangular box appears at the location of the start menu in response to the left click. In operation 208, the display update is received by the display module 138.

The monitoring agent 140 identifies whether the display update is an expected response in operation 210. More specifically, the monitoring agent 140 identifies whether the rectangular box appears at the location of the start menu within a predefined threshold time. If the monitoring agent 140 identifies that the display update occurred within the predefined threshold time, the desktop 117 is determined to be active or ready for use by the monitoring agent 140 in operation 212. When the desktop 117 is deemed ready for use by the monitoring agent 140, the notifying agent 142 notifies the CPS 130 of the desktop readiness in operation 214. If the monitoring agent 140 identifies that the display update is not an expected response in operation 210, then the desktop 117 is deemed not ready for use by the monitoring agent 140 in operation 216. If the desktop 117 is deemed not ready, the monitoring agent 140 may continue to perform injecting events. For example, the monitoring agent 140 may perform repeated left mouse clicks on the OS menu button at various time intervals.

Instead of performing the repeated left clicks, the desktop agent 136 may switch to performing different injecting event(s). For example, in operation 218, the desktop agent 136 may use the other monitoring agent 140 to perform a different injecting event(s), such as a simulated right mouse click on an empty background of the desktop 117. In response to the right click, a display update occurs in operation 220, such as having a rectangular box appear at the location of the right click on the empty background. The response to the right click is received by the display module 138 in operation 222. The monitoring agent 140 that performs the right click identifies whether the display update is an expected response in operation 224. More specifically, the monitoring agent 140 identifies whether the rectangular box appears at the location of the right click on the desktop within a predefined threshold time. If the monitoring agent 140 identifies that the display update occurred within the predefined threshold time, the monitoring agent 140 determines that the desktop 117 is active or ready for use in operation 226. The notifying agent 142 then notifies the CPS that the desktop is ready for use in operation 214.

If the monitoring agent 140 identifies that the display update did not occur within the predefined threshold time in operation 224, the desktop 117 is deemed not active or not ready for use in operation 228. If the desktop 117 is deemed not ready for use, the monitoring agent 140 may perform the injecting event(s) again. For example, the monitoring agent 140 may perform repeated right clicks at different locations on the empty background of the desktop 117 or the monitoring agent 140 may perform the right clicks at the same location at different time intervals. Alternatively, the desktop agent 136 may switch to the different injecting event that is performed by the other monitoring agent 140.

When the CPS 130 receives notification regarding the desktop readiness, the CPS 130 calculates a readiness time for the desktop 117 in operation 230. For example, the CPS 130 can calculate the readiness time by comparing the time for when the virtual desktop 117 was deemed ready for use with the start time of the virtual desktop 117. In operation 232, a performance agent, such as performance agent 128 (shown in FIG. 1), uses the readiness time to determine a performance metric of the respective hosts 110 or 112 that desktop 117 is a part of.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method, comprising:
   executing a virtual machine on a host, the virtual machine providing access to a virtual desktop on the virtual machine, and a desktop agent configured to perform a process comprising:
   simulating a first user input in the virtual machine via a monitoring agent that performs a first injecting event to produce the first simulated user input;
   receiving a first response to the first simulated user input via a display module, the first response being a display update causing pixel color values to alter;
   determining, via the monitoring agent, that the first response is an expected first response based on the altered pixel color values,
   then determining, via the monitoring agent, whether the virtual desktop is ready based on whether the first response occurred within a predefined threshold of time after the first simulated user input; and in response to determining that the virtual desktop is not deemed ready, simulating a second user input in the virtual machine via the monitoring agent that performs a second injecting event to produce the second simulated user input.

2. The method of claim 1, wherein the first simulated user input comprises one of a mouse input, a keyboard input, a USB attachment, a loading of a CD-ROM, a left mouse click on an operating system menu button, a right mouse click on an empty background, a right mouse click on an icon.

3. The method of claim 1, wherein the first response to the first simulated user input comprises a display update that includes a change.

4. The method of claim 1, further comprising determining a readiness time for the virtual desktop by comparing when the readiness of the virtual desktop was determined with a start time of the virtual desktop.

5. The method of claim 4, further comprising determining a performance metric of the host based on readiness times of a plurality of virtual desktops on the host.

6. The method of claim 4, further comprising adjusting resources based on the readiness time to optimize performance of the virtual machine.

7. The method of claim 1, further comprising:

receiving a second response to the second simulated user input in the virtual machine;

determining that the second response is an expected second response, then determining whether the virtual desktop is ready based on whether the second response occurred within a predefined threshold of time after the second simulated user input.

8. A non-transitory storage medium storing instructions which when executed by a processor cause the processor to perform a set of operations comprising:

executing a virtual machine on a host, the virtual machine providing access to a virtual desktop on the virtual machine, and a desktop agent configured to perform a process comprising:

simulating a first user input in the virtual machine via a monitoring agent that performs a first injecting event to produce the first simulated user input;

receiving a first response to the first simulated user input via a display module, the response being a display update causing pixel color values to alter;

determining, via the monitoring agent, that the first response is an expected first response based on the altered pixel color values, then determining, via the monitoring agent, whether the virtual desktop is ready based on whether the first response occurred within a predefined threshold of time after the first simulated user input; and in response to determining that the virtual desktop is not deemed ready, simulating a second user input in the virtual machine via the monitoring agent that performs a second injecting event to produce the second simulated user input.

9. The non-transitory storage medium of claim 8, wherein the first simulated user input comprises one of a mouse input, a keyboard input, a USB attachment, a loading of a CD-ROM, a left mouse click on an operating system menu button, a right mouse click on an empty background, a right mouse click on an icon.

10. The non-transitory storage medium of claim 8, wherein the first response to the first simulated user input comprises a display update that includes a change.

11. The non-transitory storage medium of claim 8, further comprising determining a readiness time for the virtual desktop by comparing when the readiness of the virtual desktop was determined with a start time of the virtual desktop.

12. The non-transitory storage medium of claim 11, further comprising determining a performance metric of the host based on readiness times of a plurality of virtual desktops on the host.

13. The non-transitory storage medium of claim 8, further comprising:

receiving a second response to the second simulated user input in the virtual machine;

determining that the second response is an expected second response, then determining whether the virtual desktop is ready based on whether the second response occurred within a predefined threshold of time after the second simulated user input.

14. A computer system, comprising:

a processor;

memory coupled to the processor; and a storage device storing instructions which when loaded into the memory and executed by the processor cause the processor to perform a set of operations comprising:

executing a virtual machine on a host, the virtual machine providing access to a virtual desktop on the virtual machine, and a desktop agent configured to perform a process comprising:

simulating a first user input in the virtual machine via a monitoring agent that performs a first injecting event to produce the first simulated user input;

receiving a first response to the first simulated user input via a display module, the response being a display update causing pixel color values to alter;

determining, via the monitoring agent, that the first response is an expected first response based on the altered pixel color values, then determining, via the monitoring agent, whether the virtual desktop is ready based on whether the first response occurred within a predefined threshold of time after the first simulated user input; and in response to determining that the virtual desktop is not deemed ready, simulating a second user input in the virtual machine via the monitoring agent that performs a second injecting event to produce the second simulated user input.

15. The computer system of claim 14, wherein the first response to the first simulated user input comprises a display update that includes a change.

16. The computer system of claim 14, further comprising determining a readiness time for the virtual desktop by comparing when the readiness of the virtual desktop was determined with a start time of the virtual desktop.

17. The computer system of claim 16, further comprising adjusting resources based on the readiness time to optimize performance of the virtual machine.

* * * * *